United States Patent [19]

Oiwa

[11] Patent Number: 5,174,274
[45] Date of Patent: Dec. 29, 1992

[54] DEFREEZING DEVICE

[75] Inventor: Masatoshi Oiwa, Nagoya, Japan

[73] Assignee: Meito Corporation, Nagoya, Japan

[21] Appl. No.: 779,765

[22] Filed: Oct. 21, 1991

[51] Int. Cl.⁵ ............................................. A47J 27/10
[52] U.S. Cl. .................... 126/379; 126/377; 126/345; 99/403
[58] Field of Search ............... 126/345, 346, 347, 348, 126/369, 369.2, 369.3, 391, 392, 350 C, 350 R, 377, 378, 379, 376; 99/403, 416, 417, 418

[56] References Cited

U.S. PATENT DOCUMENTS

| | | | |
|---|---|---|---|
| 88.251 | 3/1869 | Williamson | 99/403 X |
| 374.909 | 12/1887 | Hopper et al. | 99/416 X |
| 657.497 | 9/1900 | Parish | 126/345 |
| 722.153 | 3/1903 | Shauman | 126/369 |
| 750.515 | 1/1904 | Wunderlich | 126/345 |
| 932.905 | 8/1909 | Roberts | 126/369 X |
| 2.650.536 | 9/1953 | Russell | 99/416 |

FOREIGN PATENT DOCUMENTS 326861 12/1902 France .................. 126/345

*Primary Examiner*—Carl D. Price
*Attorney, Agent, or Firm*—Nikaido, Marmelstein, Murray & Oram

[57] ABSTRACT

This invention relates to a defreezing device for efficiently heating, by a hot water bath, a large quantity of foods to be heated such as frozen foods. This defreezing device includes a hot water bath whose upper part is capped with a cover, a combustion chamber for heating the hot water bath, a partition disposed inside the hot water bath and having a plurality of jet ports disposed in such a manner as to be capable of collecting heated and ascending hot water and bubble streams and jetting them and upward and a plurality of partition cylinders disposed above the jet ports of the partition, one for each port, in such a manner as to be capable of guiding upward the jet stream from each of the jet ports, thus making it possible to heat by the jet stream the foods put into each partition cylinder.

10 Claims, 3 Drawing Sheets

DEFREEZING DEVICE

BACKGROUND OF THE INVENTION

1. Field of the Invention

This invention relates to a defreezing device for efficiently heating, by a hot water bath, a large quantity of foods to be heated such as frozen foods.

2. Description of the Prior Art

To heat a large quantity of frozen or other foods requiring heating by a hot water bath, it has been a customary practice to put them into hot water contained in a large pan, constantly stirring the hot water.

However, if a large quantity of such foods are put at a time during the heating operation using the method described above, the temperature of hot water drops drastically and there remains a problem that desirable heating operation cannot be carried out for defreezing and so on.

SUMMARY OF THE INVENTION

In order to solve the problem described above, the present invention is directed to provide a defreezing device which can efficiently heat, by a hot water bath, a large quantity of foods to be heated.

To accomplish the object described above, the present invention provides a defreezing device which comprises a hot water bath whose upper part is capped with a cover, a combustion chamber for heating the hot water bath, a partition disposed inside the hot water bath and having a plurality of jet ports disposed in such a manner as to be capable of collecting heated and ascending hot water and bubble stream and then jetting them upward and a plurality of partition cylinders disposed above the jet ports of the partition, one for each port, in such a manner as to be capable of guiding upward the jet stream from each of the jet ports, thus making it possible to heat by said jet stream the foods put into each partition cylinder.

In accordance with the present invention, hot water and a bubble stream that are heated and ascend inside the hot water bath are collected by the partition, held at the jet ports and then jetted upward from the jet ports.

The jet stream of hotter water and stream bubbles is guided into each partition cylinder, comes into contact with overall surface of the foods to be heated put into each partition cylinder, transfers heat and rises further.

The jet stream from which the heat is removed after heating the foods to be heated overflows onto the cover from the upper part of the partition cylinder and then discharged, while the hot water temperature inside of each partition cylinder is kept at a desirable level because of the ascending subsequent jet stream.

The defreezing device in accordance with the present invention comprises the partition having a plurality of jet ports for collecting hot water and stream bubbles and jetting them upward into the partition cylinders from each of the jet ports, wherein the foods to be heated are heated by contacting the jet stream and the jet stream deprived of the heat is allowed to overflow onto the cover from the top of the partition cylinder. Thus, the defreezing device of the present invention can prevent the temperature drop of the entire hot water inside the hot water bath and can keep the water temperature inside each partition cylinder at a desirable heating temperature because of the uninterrupted jet stream.

Accordingly, the defreezing device of the present invention makes it possible to simultaneously put the foods to be heated into each partition cylinder, in large quantity and complete the heating operation for frozen and other foods within a short period of time. Furthermore, it can automatically replace with new hot water inside the hot water bath by allowing the overflow of the heat-deprived jet stream. By having an automatic water feeding apparatus consisting of a ball tap etc., it is possible to replenish water by the amount lost as overflow, so that the water level is constant and clean water is available all the time.

Furthermore, a bottom inner tank and a bottom outer tank are formed on the bottom of the hot water bath and, inner and outer flues are disposed between them for heating. Accordingly, a heat exchange area can be increased and high heat efficiency can be obtained. Since the exhaust temperature can be lowered down to 90° C.~110° C. in comparison with 250° C.~300° C. in the conventional defreezing device, processing of the exhaust gas can be carried out more easily.

The above and other objects and novel features of the present invention will become more apparent from the following detailed description of the invention when taken in conjunction with the accompanying drawings.

DESCRIPTION OF THE PREFERRED EMBODIMENT

Figure 1:
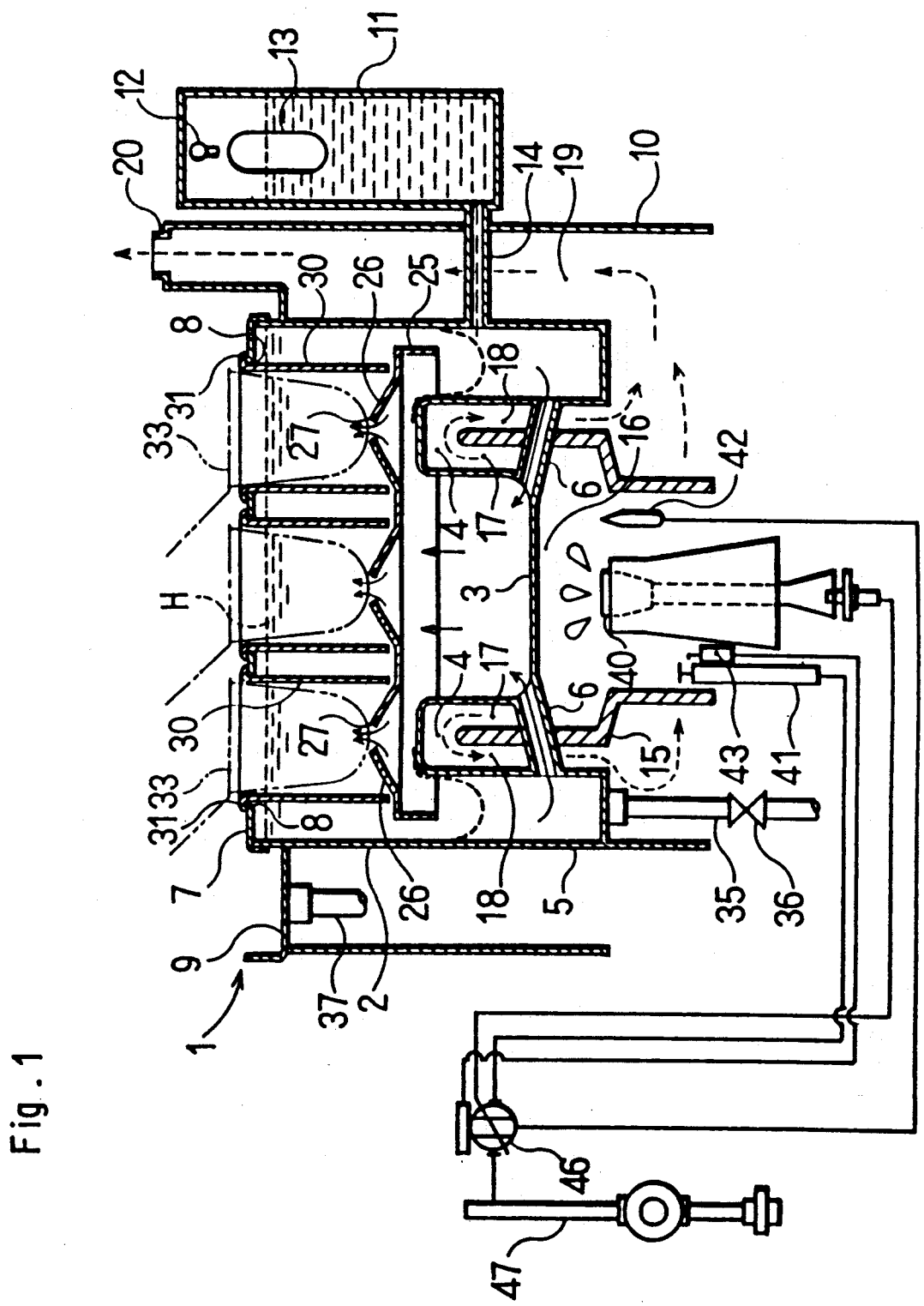
FIG. 1 is a structural sectional view of a defreezing device in accordance with an embodiment of the present invention.
Figure 2:
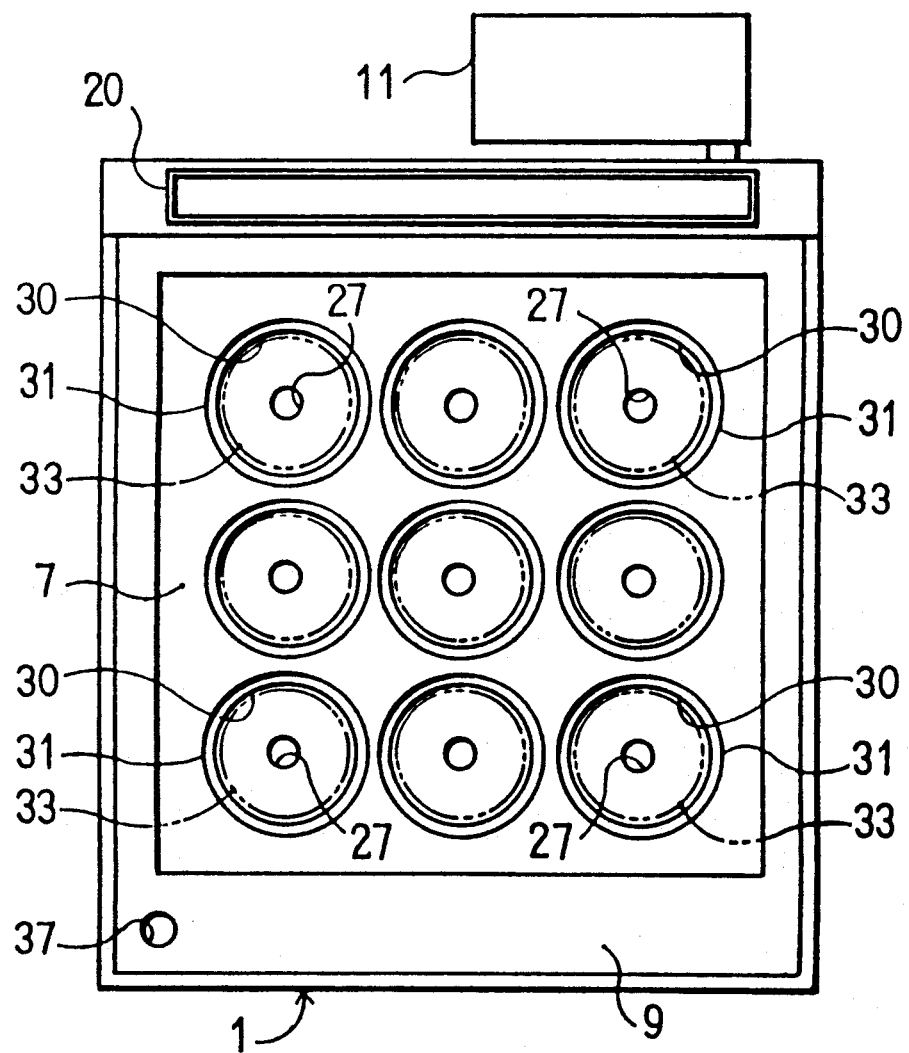
FIG. 2 is a plan view of the defreezing device.

Hereinafter, a preferred embodiment of the present invention will be described with reference to FIGS. 1 and 2 of the accompanying drawings.

A defreezing device 1 comprises a hot water bath 2 whose upper part is capped with a cover 7, a combustion chamber 16 for heating the hot water bath 2, a partition 25 which has a plurality of jet ports 27 disposed in such a manner as to collect heated and rising hot water and stream bubbles and jet them upward and a plurality of partition cylinders 30 each being disposed in such a manner as to guide the jet stream from each jet port to the upper portion.

The hot water bath 2 in this embodiment has a rectangular outer shape and its upper part is capped with the cover 7. A plurality of cover holes 8 (nine holes in this embodiment) are bored in the cover 7 so that the partition cylinders 30 described later can be fitted into the holes 8, one in each hole.

A bottom inner tank 3 having a flat round shape projecting downward is formed at the center of the bottom of the hot water bath 2, and a bottom outer tank 5 having a flat rectangular shape projecting downward is formed outside the bottom inner tank 3 in such a manner as to encompass the bottom inner tank 3 while interposing a flue area 4 between them. The lower part of the bottom outer tank 5 and the lower part of the bottom inner tank 3 are communicated with each other by a plurality of communication pipes 6. A feed tank 11 is communicated with the bottom outer tank 5 through a feed pipe 14. The feed tank 11 is equipped with a feed port 12 and a ball tap so as to supplement an insufficient amount of water lost and to keep the predetermined hot water level H. A through-like ceiling board 9 is disposed around the outer periphery of the upper part of the hot water bath 2 in order to receive overflowing hot water from the cover 7, and a conduit 37 for discharging overflowing hot water is disposed in the ceiling board 9. A heat insulating wall 10 is disposed below the ceiling board 9 is such a manner as to encompass the side portions and lower portions of the hot water bath 2 and to form a flue area 19 between the insulating wall and the hot water bath 2. An exhaust cylinder 20 is disposed at a predetermined position of the heat insulating wall 10.

A stepped cylindrical combustion cylinder 15 provided in flue area 4 encompasses the bottom inner tank 3 with a predetermined spacing. This combustion cylinder 15 is made of zirconia capable of emitting far infrared rays when it is heated, and forms a combustion chamber 16 between the cylinder 15 and the bottom surface of the bottom inner tank 3. An inner flue area 17 is formed between the combustion cylinder 15 and the bottom inner tank wall 3, and an outer flue area 18 communicating with the inner flue 17 is formed between the combustion cylinder 15 and the bottom outer tank 5. The outer flue area 18 is communicated with the flue area 19.

The partition 25 in this embodiment includes nine conical portions 26, whose apexes are bored to form jet ports 27. The outer periphery of this partition 25 is bent downward and the partition 25 is disposed horizontally at a predetermined position inside the hot water bath 2 with a predetermined spacing from the inner wall of the hot water bath 2.

A partition cylinder 30 in this embodiment is shaped in a cylindrical form, and its upper end portion has a flange-like edge 31. This partition cylinder 30 is formed to fit into a cover hole 8 of the cover 7 with its edge portion 31 in contact with the upper surface of the cover 7 and its lower end portion positioned immediately above the bottom of the conical portion 26. Reference number 33 represents a defreezing cage with a handle, whose shape permits it to be put into and taken out of the partition cylinder 30 with foods to be heated. A drain conduit 35 having a drain valve 36 is disposed at the bottom of the bottom outer tank 5.

In the combustion chamber 16, a secondary air induction type main burner 40, a pilot burner 41 and a go-out prevention sensor 42 are provided, and they are connected to a gas feed pipe 47 through a gas pilot cock 46, respectively. Reference number 43 represents a spark igniter for igniting the pilot burner 41.

Next, the operation of the defreezing device with the construction described above will be explained.

When the main burner 40 of the combustion chamber 16 is ignited, its flame heats the bottom surface of the bottom inner tank 3. Then, the high temperature combustion gas generated at this time passes through the inner flue area 17, the outer flue area 18 and the flue area 19 and is exhausted from the exhaust cylinder 20 while its temperature drops gradually.

This way, the effective heating areas widely covers from the bottom surface of the bottom inner tank 3, its sidewalls, the inner sidewalls of the bottom outer tank 5, the bottom surface to outer sidewalls. The combustion cylinder 15 is heated to high temperatures and emits the far infrared rays from its inner and outer walls, and the radiant heat of the far infrared rays is superposed with the heat of the high temperature combustion gas and heats the bottom inner tank 3 and the bottom outer tank 5.

On the other hand, hot water that is heated in the bottom inner tank 3 and the bottom outer tank 5 rises with a great number of resulting steam bubbles. This ascending stream is collected by the partition 25, is held by each conical portion 26 and them jetted upward from each jet port 27.

The jet stream jetted from the jet port 27 is guided upward by the partition cylinder 30 which restricts the stream to disperse sideways. This jet stream comes into full contact with the foods to be heated which is placed in each defreezing cage 33 placed into the partition cylinder 30 and transfers the heat. The groups of bubbles perform agitation of hot water at the same time. The jet stream whose heat has been used is jetted upward while being guided by the partition cylinder 30, then overflows onto the cover 7 passing the edge portion 31 of the partition cylinder 30 and flows onto the ceiling board 9, and finally discharged from the conduit 37. Therefore, this will not allow the used water of lower temperature after heating the food to go back to the hot water level H. Hot water at the upper part of the hot water bath 2 which comes into contact with the outer periphery of the partition 30 will lose heat to a certain extent and circulates down into the bottom inner tank 3 via the bottom outer tank and the communication pipes 6 and then rises again after being re-heated. Therefore, the temperature drop of entire hot water inside the hot water bath 2 can be prevented.

Furthermore, a jet stream described above is jetted into the partition cylinder 30 and the internal temperature of each partition cylinder 30 can be kept at a desirable heating temperature. Accordingly, it is possible to defreeze or otherwise process the food simultaneously in each partition cylinder 30 and in large quantity efficiently.

Figure 3:
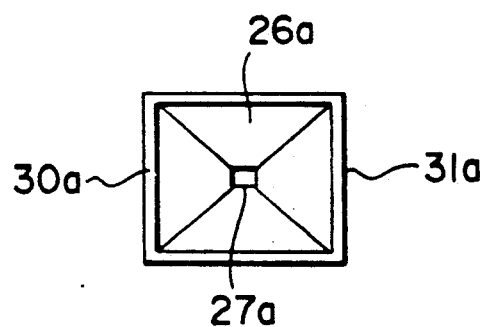
FIG. 3 is a plan view of one of the partition cylinders of the present invention having a square tube shape.

The present invention is not particularly limited to the description and embodiment shown in the drawing but can be changed or modified in various ways without departing from the technical concept thereof. For instance as shown in FIG. 3, the conical portions 26 may have a pyramid shape 26a, with square shaped jet ports 27a; the partition cylinder 30 may be a square pipe 30a, having a square edge portion 31a, and yet the same function and effect can be likewise obtained.

The application of the defreezing device 1 in accordance with the present invention is not particularly limited to the defreezing operation of frozen foods but it can naturally be applied to the boiling operation of pastas, for example, so long as foods need to be heated by the hot water bath.

What is claimed is:

1. A defreezing device comprising:
   a vessel containing a hot water bath whose upper part is capped with a cover;
   a combustion chamber located under and attached to said vessel for heating said hot water bath;
   a partition disposed inside said vessel containing said hot water bath, having a plurality of jet ports capable of collecting ascending hot boiling water and bubble streams heated by said combustion chamber and allowing them to jet upward; and
   a plurality of partition cylinders, each being vertically disposed above each of said jet ports of said partition in such a manner as to be capable of guiding upward a jet stream from each of said jet ports;

wherein foods are placed and heated by said jet stream.

2. A defreezing device according to claim 1, wherein said vessel containing said hot water bath is shaped to form a bottom inner tank protruding downward at the center of the bottom of said hot water bath and also a bottom outer tank protruding downward in such a manner as to encompass said bottom inner tank while interposing a flue area between them.

3. A defreezing device according to claim 2, wherein said bottom inner tank and said bottom outer tank communicate with each other by a plurality of communication pipes crossing transversely said flue area.

4. A defreezing device according to claim 2, wherein a combustion cylinder is disposed in said flue area encompassing said bottom inner tank with a spacing between said bottom inner tank and said bottom outer tank, so that an inner flue area and an outer flue area are formed.

5. A defreezing device according to claim 4, wherein said combustion cylinder is made of a ceramic material capable of emitting far infrared rays when it is heated.

6. A defreezing device according to claim 1, wherein the outer periphery of said partition is bent downward.

7. A defreezing device according to claim 1, wherein each of said jet ports of said partition is bored at the apex of each of a plurality of conical portions.

8. A defreezing device according to claim 1, wherein each of said jet ports of said partition is bored at the apex of a plurality of pyramidal portions.

9. A defreezing device according to claim 1, wherein said partition cylinder is shaped in a cylindrical shape.

10. A defreezing device according to claim 1, wherein said partition cylinder is shaped in a square tube shape.

* * * * *